Figure 1:
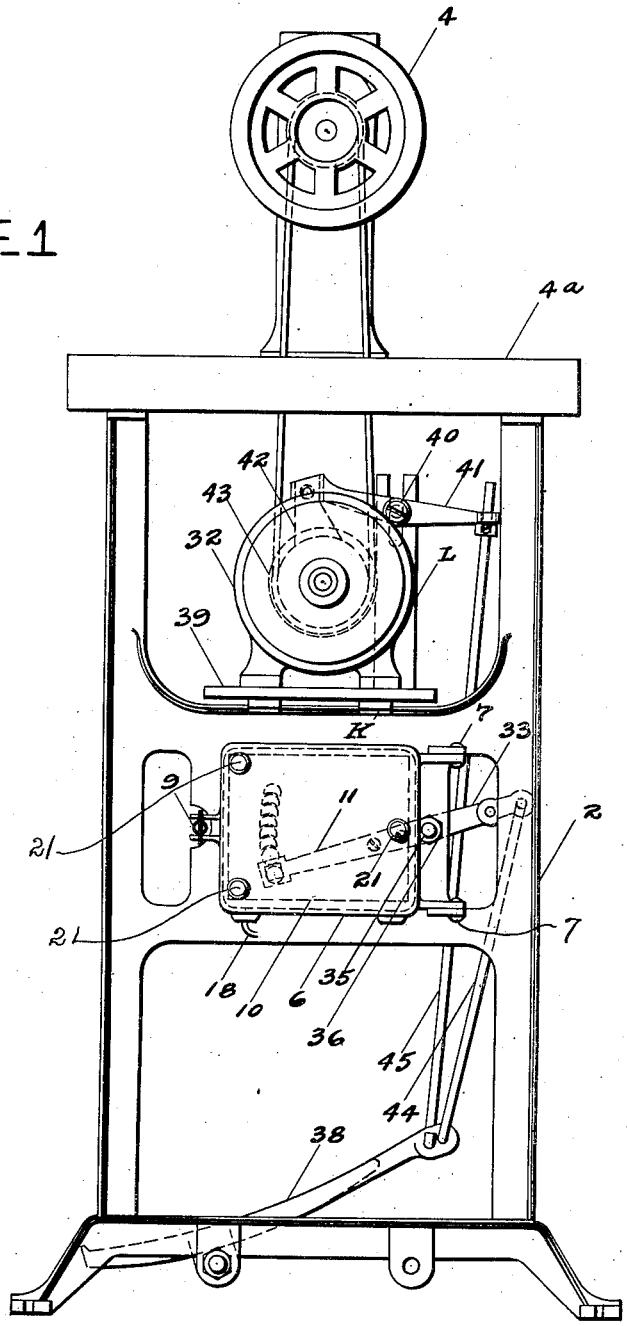

S. DESURE.
ELECTRIC POWER TABLE.
APPLICATION FILED MAR. 6, 1919.

1,332,434.

Patented Mar. 2, 1920.
4 SHEETS—SHEET 1.

INVENTOR
Samuel Desure
by
Mock & Blum
Attorneys

S. DESURE.
ELECTRIC POWER TABLE.
APPLICATION FILED MAR. 6, 1919.

1,332,434.

Patented Mar. 2, 1920.
4 SHEETS—SHEET 2.

INVENTOR
Samuel Desure
by
Mock & Blum
Attorneys

S. DESURE.
ELECTRIC POWER TABLE.
APPLICATION FILED MAR. 6, 1919.
1,332,434.
Patented Mar. 2, 1920.
4 SHEETS—SHEET 3.
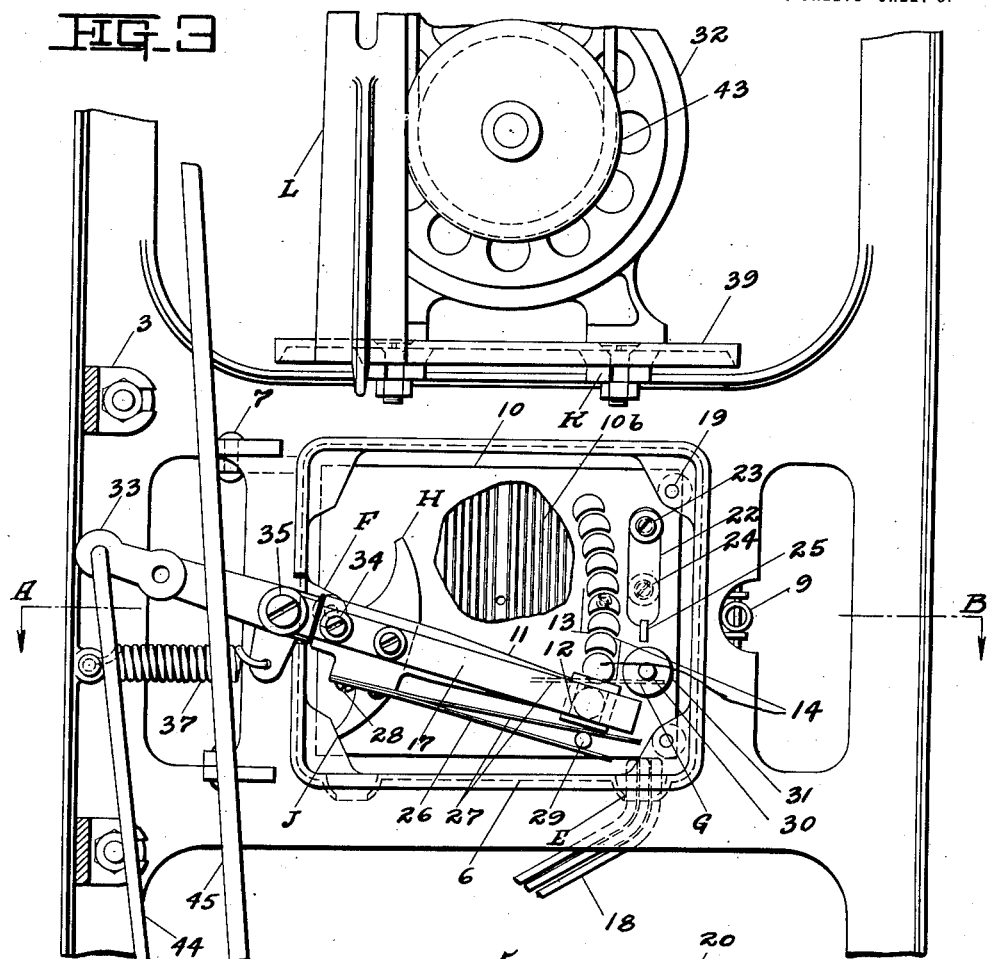
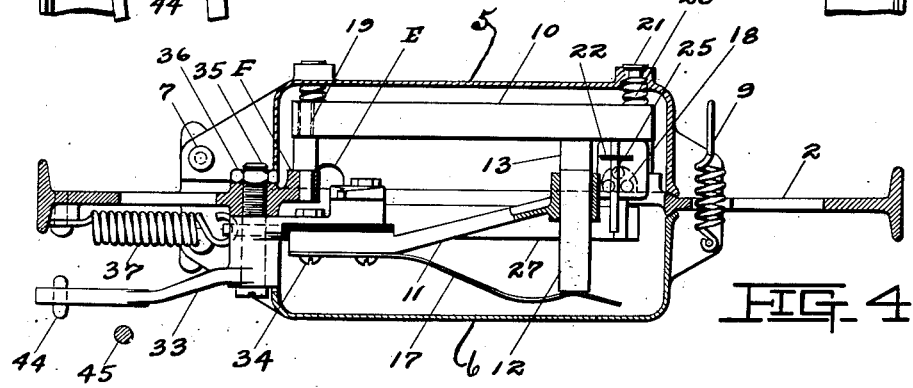
INVENTOR
Samuel Desure
by
Mock & Blum
Attorneys S. DESURE.
ELECTRIC POWER TABLE.
APPLICATION FILED MAR. 6, 1919.
1,332,434.
Patented Mar. 2, 1920.
4 SHEETS—SHEET 4.
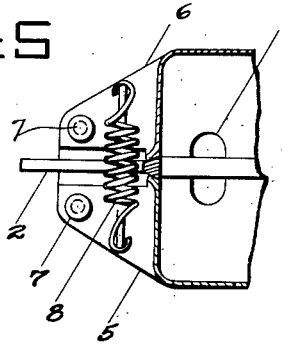
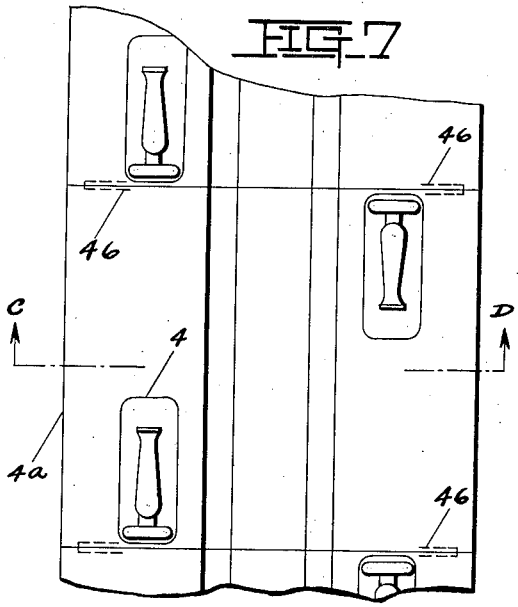
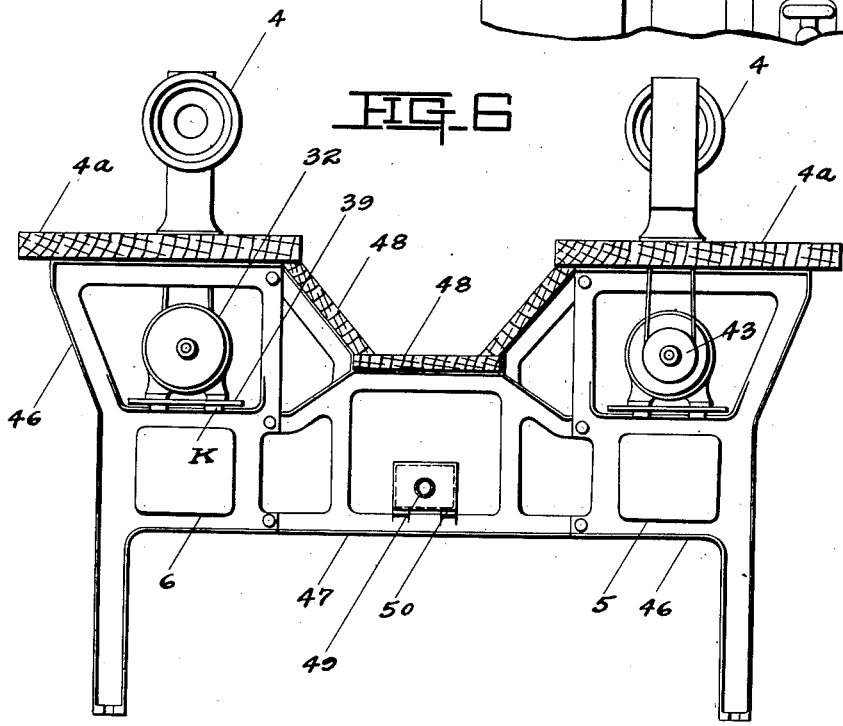
INVENTOR
Samuel Desure
by
Mock & Blum
Attorneys

UNITED STATES PATENT OFFICE.

SAMUEL DESURE, OF NEW YORK, N. Y.

ELECTRIC-POWER TABLE.

1,332,434.  Specification of Letters Patent.  Patented Mar. 2, 1920.

Application filed March 6, 1919. Serial No. 281,032.

*To all whom it may concern:*

Be it known that I, SAMUEL DESURE, a citizen of the United States, residing at 131 Spring St., New York, in the county of New York and State of New York, have invented certain new and useful Improvements in Electric-Power Tables, of which the following is a specification.

The present invention relates to an electric power table or stand used for supporting and driving some kind of power apparatus, to start, stop and vary the speed of the electric motor to suit the different requirements met with in the operation of said power apparatus. The above power apparatus may be sewing machines and any other light running machinery.

The objects of this invention are to provide a simple and practical electric motor controlling apparatus and an electric power table or stand combined as a unit, said unit being made up of a small number of parts of such a construction as to keep same in their respective places and to function consistently.

The construction herein contemplated is a power table or stand comprising a structure for supporting a sewing machine or other power apparatus, said table or stand being simple, easy to manufacture, and securely held together by permanent means and having a minimum number of parts connected by screws which become loosened by vibration, etc., and thereby make said stand insecure as well as cause other parts of said apparatus to function poorly. Combined with said table I contemplate a starting box or electric motor controlling apparatus of a practical, simple and durable construction, said electric motor controlling apparatus having all parts permanently held in place and being easily taken apart for adjustment, repairs, or inspection.

The present invention will be more specifically described hereinafter, and further pointed out in the appended claims.

In this specification of the illustrative embodiment of my invention I have described and shown certain details of construction, but it will however be understood that I do not limit myself to the structural details given and that my invention may be applied in different ways to suit varying requirements. While a sewing machine is used in the said explanation, this invention is not limited to machines of this character but may be applied to any light running machinery.

Figure 2:
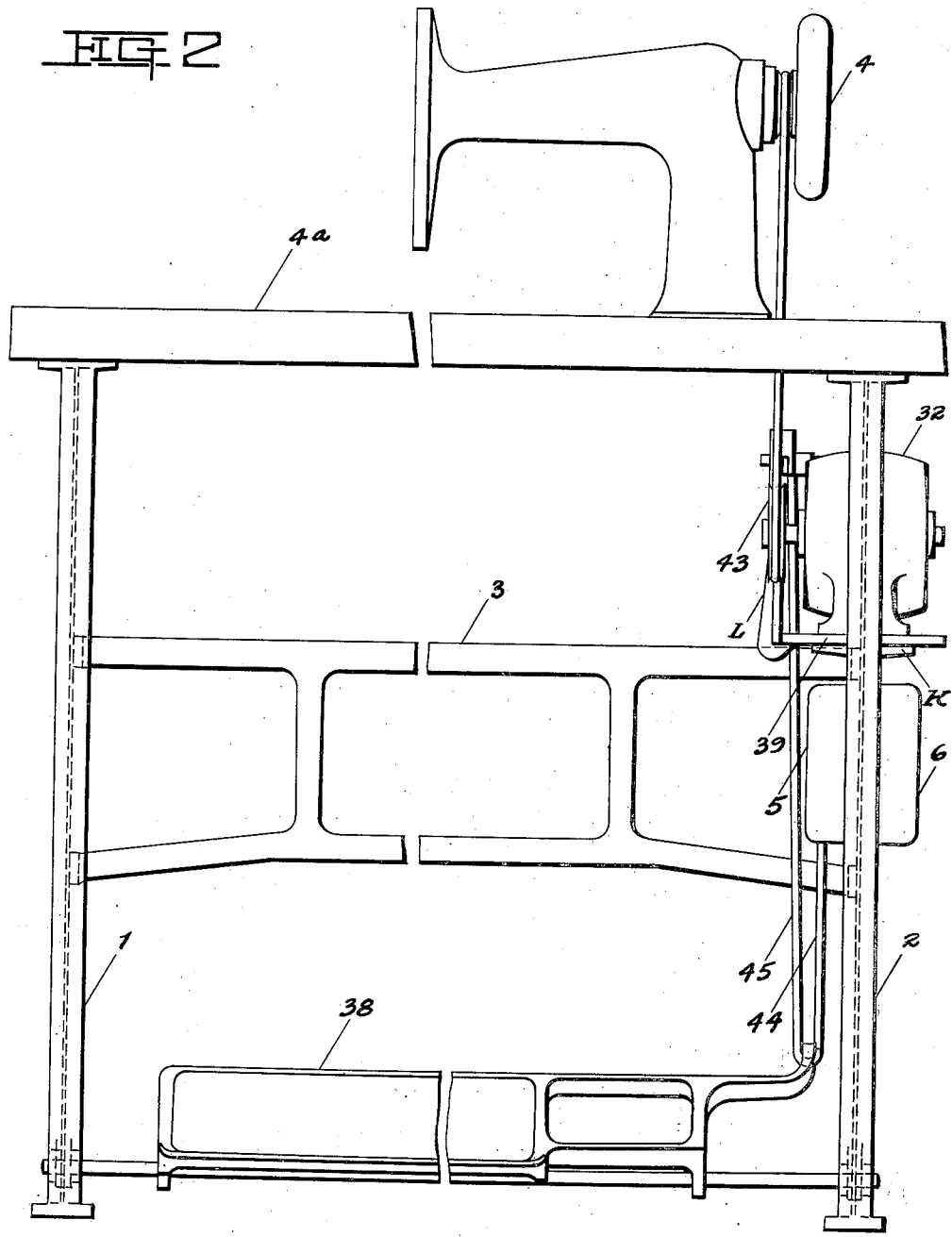

In the drawings, Figure 1 is an end view of an apparatus embodying the present invention. Fig. 2 is a front elevation of Fig. 1 with a central section broken out. Fig. 3 is an enlarged elevation of the electric motor controlling mechanism shown with one inclosing cover removed. Fig. 4 is a section on the line A—B in Fig. 3. Fig. 5 is a plan view of the cover closing device for the inclosing covers. Fig. 6 is a sectional view on the line C—D of Fig. 7 and shows a different application of the present invention and Fig. 7 is a plan view of Fig. 6.

As shown on the drawings in Figs. 1 and 2, the member 1 forms one support of a table or stand, with member 2 as the other support, the interposed member 3 completing said supporting structure on which is carried the driven apparatus, it being in this case a sewing-machine 4, carried on the table 4ª. Hinged to the said member 2 are two suitable covers 5 and 6 swinging upon hinge pins 7. The said covers 5 and 6 are forced into the closed position by a spring 8 as shown in Fig. 5. The spring 9 serves to keep the covers together more securely. A housing or inclosure for the resistance wire slab 10 is provided in cover 5 and an insulated arm member 11 is pivotally mounted on a spindle 35, which passes through member 2 and is held in place by nut 36, a recess being provided in each cover to enable the entrance and movement of the arm 11. The arm 11 has means for holding a contact member or carbon 12. The said carbon may contact with the live studs 13 and dead studs 14, and by the manipulation of the switch arm the carbon 12 is moved across the face of said studs, thereby making or breaking the electric circuit or varying the amount of resistance. The cover 5 could be made integral with the member 2. One of the improvements in the present invention is the crescent shaped contact studs 13 and 14, the said studs being made in this shape to avoid an arc between said studs 13 and the member 12 when the switch arm is moved from one position to another, since the carbon always contacts with two of said crescent studs. With this construction it is obvious that there will also be a far greater contact surface between the member 12 and studs 13 than would be possible with round studs. The studs 13 and 14 are secured to the slab 10 in any suitable manner. The member 12 is held in contact with the studs by a suitable spring 17 carried on the switch arm member 11 by means of screws 34. The studs 14, are dead and merely act as a support for the member 12 when at its "off" position, the necessary wire connections to the slab being the wires 18 which pass through hole E in the covers 5 and 6, and are securely connected to the resistance wire $10^b$. The starting box herein illustrated is of the "three-point" type, although other types might be used.

The slab 10 is supported on pins 19 passing through holes in same, the pins 19 being permanently secured in lugs F extending into openings of the member 2, the above said holes in the slab 10 being slightly larger than the pins 19 to allow the slab to be removed without tools when the cover 5 is opened. On the inside of the cover 5 a number of suitable compression springs 20 are held by members 21. When the cover 5 is closed the springs 20 exert pressure upon the slab 10 and thereby hold same in place. In the construction just described it is obvious that the resistance slab and the directly connected line wires may be completely removed from the inclosure without disconnecting any wires, manipulating any screws or breaking any connections. The springs 20 and securing members 21 may be replaced by rigid means for forcing the slab home, the springs 20 being used to obviate the necessity of machine work and the manipulation of screws, etc., as it is obvious that the springs will force the slab into and hold the same in place.

On the slab 10 is fixed a suitable switch for breaking the circuit when the contact member 12 has become worn short and then makes only partial contact with the studs 13. It is obvious that an interrupted contact on the studs 13 will cause an electric arc and thereby tend to melt away or destroy said studs. For the purpose of illustration I have shown a type of switch as below described, but it will however be understood that I do not limit myself to the exact details of construction herein outlined. The above said switch is comprised of a suitable blade spring 22 having one end secured to the slab 10 by a screw 23. At a suitable distance from one end of said spring 22 is located another screw and binding post 24. The spring 22 is held in contact with the said post 24 by a suitable trigger or catch diagrammatically illustrated at 25. When the carbon or member 12 becomes short and is rotated downwardly around its spindle the spring 17 will strike the catch 25, which releases the spring 22, and thereby positively breaks the circuit and causes same to remain broken until the attendant renews the member 12 and replaces the spring 22 under the catch 25.

Two blade springs 26 and 27 are connected to the switch arm 11 by screws 28. The spring 26 always makes contact with the post 29, which is electrically connected to the screw 23 by means of the resistance wire $10^b$, which is arranged in a number of windings connected in series between the live crescent-shaped studs 13, in the well-known manner. One of the wires 18 is connected to the post 29 so that the springs 26 and 27 and the switch arm 11, are always connected to one pole or terminal of the circuit. The other wire 18 that is connected to the armature of the motor, according to the well-known "three-point" system, is connected to the binding post 24 which is connected to screw 23 by means of spring 22. The pin or armature 30 of the electro-magnet 31 is also connected to the first live stud 13.

Hence when the switch arm is moved upwardly, the line current passes from post 29 through the entire resistance coil $10^b$ through spring 22 to the post 24 and thence to the armature of the motor. However, before the carbon 12 contacts with a live stud, the blade spring 27 contacts with pin 31 as shown in dotted lines in Fig. 3. As the carbon 12 is moved upward, parts of the resistance coil $10^b$ are cut out of the circuit in the well-known manner, until the full line current passes through the switch arm to the post 24.

When the switch arm 11 is rotated downwardly, the carbon 12 moves to the first dead button 14 without a spark because the blade spring 27 is still in contact with the pin 30 because of the magnetic attraction thereof, so that the circuit is not broken until blade spring 27 is removed from pin 30. Since the switch arm 11 is moved downward with considerable force and speed by the spring 37, when this arm strikes the blade spring 27, it removes it very rapidly from the pin 30, so that arcing is minimized. The resiliency of the blade spring is important as it causes this spring to fly away with great rapidity from pin 30 when it is struck by the switch arm. The magnet coil 31 is energized by any suitable means.

Forming the outward end of said switch arm is a second member 33 which is insulated from the member 11 and held thereto the said member 33 being pivotally mounted on the stud or spindle 35 which is screwed into the support 2 and further secured by the lock nut 36. Extending downwardly on said member 33 is a suitable lug having a hole to receive a retracting spring 37, the other end of said spring being fixed to the member 2 by suitable means. The spring 37 serves to bring the contact member 12 to the off or "dead" position when the foot treadle 38 is released. The points H and J on the member 33 serve to limit the movement of the switch arm.

On the supporting member 2 are outwardly extending lugs K to receive a bracket 39 on which is secured the electric driving motor 32, said bracket 39 having a vertical extension L carrying a suitable adjustable pivot 40 on which is mounted the brake arm 41, the same having at one end a suitable braking pad 42 to act on the motor pulley 43, the said brake being made operative by the release of the foot treadle 38 which is connected to the switch arm member 33 by a connection 44. The spring 37 will then cause the said brake pad 42 to be depressed upon the motor pulley 43 simultaneously with breaking the electric current, the brake being actuated from the treadle 38 by the link 45, which has an adjustable collar at its upper end.

In Fig. 6 is shown a partial view of a modified type of power table included in this invention which has the same characteristics as the type hereinbefore described in regard to the operation and arrangement of the electric motor and motor controlling apparatus, but the construction of the supporting table is such as to carry two machines placed oppositely with a depressed table or work trough between said machines to hold material being operated upon, the table structure in this latter case is composed of the two supporting members 46 and the interposed member 47 which ties said members 46 together and also forms the trough. Two members 46 and one member 47 make one set or supporting unit. In the operation of power tables of this type it is customary to arrange a desired number of units in succession or as many as the available space will permit. The number of supporting units as above described is one more than half the number of driven machines set up in the line, each of the said units, having two electric motors and two controlling apparatuses, namely one for each driven machine. It is obvious that with this construction a very compact power table is secured. A feature of these supporting units is that substantially the same parts as are used in the first described motor controlling apparatus are used in the double table herein described and thereby effect a saving due to having a smaller number of parts. The boards 48 form the above said work trough. A suitable conduit 49 for carrying the current wires to the electric motors is passed through a suitable terminal box 50 which is secured to the member 47.

As seen in Fig. 4, the part of the spring 17 adjacent the carbon 12 is arcuate so that the spring 17 presses against the center of the carbon 12 which prevents the carbon 12 from binding in its socket as it wears down.

The crescent shaped buttons 13 fit into depressions in the slab 10 made of insulating material, which have the same crescent shaped configuration. Because of this noncircular shape of these depressions or sockets and the buttons, it is impossible for the buttons to turn or shift in their sockets. Hence to firmly secure the buttons in their sockets and to the slab 10, it is only necessary to run a small screw through the back of the slab into each crescent shaped button, which enables the button to be held to the slab in a firm and secure manner by only a single screw which takes up very little space. Because of this construction the buttons can be made small so that even a small box can have a large number of buttons and a large number of speeds. As the switch arm is operated by the foot of the operator which can only travel through a small distance, it is desirable to have a large number of buttons in a small space.

I have described a preferred embodiment of my invention, but it is clear that numerous changes and omissions could be made in its details without departing from the spirit of my invention.

I claim:

1. In combination, a support, a starting box having its inclosure secured to the said support, one of the sides of said starting box being hinged to the said support so that it can be swung away from the other side thereof in a direction perpendicular to said other side, a member pivoted to the said support intermediate the hinge of the first mentioned side of the said cover and the end wall thereof, and a switch arm carried by the said member, and means located in the said inclosure whereby the movement of the said switch arm controls the current passing through the said box.

2. In combination, a support, a starting box having its inclosure secured to the said support, a pivoted switch arm adapted to be rotated within the said inclosure, a slab made of insulating material and located within the said inclosure, holding means adapted to hold the said slab within the said inclosure, the side of said cover adjacent the said slab being movable so that it can be moved away from the other side of the said inclosure, and means intermediate the said movable side and the said slab whereby when the said side is secured in closed position, the said intermediate means force the said slab into the proper position, and means for keeping the said movable side in closed position.

3. In combination, a support, a starting box having its inclosure secured to the said support, one of the sides of the said inclosure being hinged to the said support so that it can be swung away from the other side, means for keeping the said hinged side in closed position, pins projecting from the said support at right angles thereto in the direction of the said hinged side, a slab made of insulating material having perforations into which the said pins can fit so that the said slab can be moved to and fro on the said pins, and springs intermediate the interior of the said hinged side and the said slab, the said springs being adapted to force the said slab into proper position when the said hinge cover is closed.

4. In combination, a support, a starting box having its inclosure secured to the said support, a slab made of insulating material and located within the said inclosure, and contact buttons of substantially crescent shape located in the said slab.

5. In combination, a support, a starting box having its inclosure so that it has a limited movement therein secured to the said support, a slab made of insulating material and held within the said inclosure, contact buttons located on the said slab, a plurality of coils of resistance wire arranged in series between the said contact buttons and secured to the said slab, a pivoted switch arm adapted to rotate within the said inclosure, a carbon carried by the said switch arm and adapted to contact with the said contact buttons, means for passing a current through the said switch arm and the said resistance coils, and a circuit breaker located on the said resistance slab and adapted to be operated by the movement of the said switch arm when the said carbon gets too short.

6. In combination, a support, a starting box having its inclosure secured to the said support, a slab made of insulating material and held within the said inclosure, contact buttons located on the said slab, a plurality of coils of resistance wire arranged in series between the said contact buttons and secured to the said slab, a pivoted switch arm adapted to rotate within the said inclosure, a carbon carried by the said switch arm and adapted to contact with the said contact buttons, means for passing a current through the said switch arm and the said resistance coils, and a circuit breaker located on the said resistance slab and adapted to be operated by the movement of the said switch arm when the said carbon gets too short, the said circuit breaker including a blade spring adapted to be held against a post by a catch, the said catch being released by the movement of the said switch arm when the said carbon gets too short, so that the said blade spring is then free to spring away from the said post and break the circuit.

7. In combination, a support, a starting box having its inclosure secured to the said support, a pivoted switch arm adapted to be rotated within the said inclosure, a slab made of insulating material and located within the said inclosure, a series of contact buttons located on the said slab, a plurality of coils of resistance wire arranged in series between the said buttons, a carbon connected to the said switch arm and adapted to contact with the said contact buttons, means for forcing the said carbon against the said contact buttons, means for leading an electric current through the said switch arm to the said contact buttons and resistance coils, a magnet having an armature connected to the first of said contact buttons, conducting means secured to the said switch arm and adapted to contact with the said armature before the said carbon touches the said first contact button and to remain in contact with the said armature as the said carbon is caused to contact with other contact buttons, and means for retracting the said switch arm so that the said carbon is removed from contact with the said buttons, whereby the circuit is always broken between the said armature and the said conducting means.

8. In combination, a support, a starting box having its inclosure secured to the said support, a pivoted switch arm adapted to be rotated within the said inclosure, a slab made of insulating material and located within the said inclosure, a series of contact buttons located on the said slab, a plurality of coils of resistance wire arranged in series between the said buttons, a carbon connected to the said switch arm and adapted to contact with the said contact buttons, means for forcing the said carbon against the said contact buttons, means for leading an electric current through the said switch arm to the said contact buttons and resistance coils, a magnet having an armature connected to the first of said contact buttons, conducting means secured to the said switch arm and adapted to contact with the said armature before the said carbon touches the said first contact button and to remain in contact with the said armature as the said carbon is caused to contact with other contact buttons, and means for retracting the said switch arm so that the said carbon is removed from contact with the said buttons, whereby the circuit is always broken between the said armature and the said conducting means which consist of a blade spring.

9. In combination, a starting box having an inclosure, a support therefor, a slab made of insulating material and located within the said inclosure, the said slab having a series of non-circular contact buttons having substantial surfaces adjacent and substantially parallel to each other and fitting into similar depressions, means for securing the said contact buttons to the said slab, a plurality of resistance coils arranged in series between the said contact buttons, and a pivoted switch arm adapted to rotate within the said inclosure and make contact with the said contact buttons in succession, the said switch arm being so shaped that it contacts with one of the said parallel surfaces before it leaves the other.

In testimony whereof I hereunto affix my signature.

SAMUEL DESURE.